United States Patent [19]

Pobgee

[11] 4,080,514
[45] Mar. 21, 1978

[54] GRAPHICAL INPUT APPARATUS FOR ELECTRICAL EQUIPMENT

[75] Inventor: Peter John Pobgee, Surbiton, England

[73] Assignee: National Research Development Corporation, London, England

[21] Appl. No.: 732,372

[22] Filed: Oct. 14, 1976

[30] Foreign Application Priority Data

Oct. 21, 1975 United Kingdom ............... 43166/75

[51] Int. Cl.² ............................................. G08C 21/00
[52] U.S. Cl. ........................................ 178/18; 178/19
[58] Field of Search ................. 178/18, 19, 20, 87; 340/365 E, 146.3 E, 146.3 SY; 33/1 M; 35/9; 346/139 C

[56] References Cited

U.S. PATENT DOCUMENTS

| 3,633,180 | 1/1972 | Pabst | 340/365 E |
| 3,885,097 | 5/1975 | Pobgee | 178/18 |
| 3,921,165 | 11/1975 | Dym | 178/18 |

*Primary Examiner*—Thomas A. Robinson
*Attorney, Agent, or Firm*—Cushman, Darby & Cushman

[57] ABSTRACT

Two improvements are disclosed for a known graphical input tablet employing a resistive sheet stretched across, but spaced from, a resistive member, wherein the co-ordinates of a point are indicated by pressing the sheet into contact with the member at the point: firstly the resolution of the tablet is increased by the addition of conducting strips dividing the sheet and/or the member into regions, and a circuit for indicating in which region the contact occurs; and secondly by the addition of a circuit for indicating when two such contacts are made at the same time.

14 Claims, 6 Drawing Figures

GRAPHICAL INPUT APPARATUS FOR ELECTRICAL EQUIPMENT

The present invention relates to the determination of the co-ordinates of a point indicated, for example, by using a stylus on a surface. The invention is particularly, but not exclusively, useful as in input device for a computer or for telegraphic apparatus, where the input is to be in the form of writing, charts, graphs or drawings.

The invention is an improvement in or modification of the invention disclosed in U.K. Pat. No. 1,310,683 and U.S. Pat. No. 3,885,097. The graphical input apparatus described in the above mentioned specifications has a resolution in co-ordinates generated which is limited by the uniformity obtainable in resistive coatings.

Higher resolution also requires more complex analogue to digital conversion circuits for use with a computer.

In this specification, apparatus of the type specified for generating signals representing the co-ordinates of a point, includes a sheet of electrically resistive material held in tension across, and adjacent to, but not in contact with, the smooth surface of an electrically resistive member, the sheet being of such material and/or so mounted that it is able to make contact temporarily with the said surface of the resistive member over a relatively small area when pressed towards the said surface by means for indicating the position of a point, change-over means for causing current supplied to the apparatus to flow alternately in two paths, a first path in which current flows in a substantially single direction through the sheet, and a second path in which current flows in a substantially single direction at an angle to the other current direction through the resistive member, and means for deriving first and second signals, when the sheet is pressed at a relatively small area into contact with the resistive member, the first signal being dependent upon the voltage of the sheet when current flows through the resistive member, the second signal being dependent upon the voltage of the resistive member when current flows through the sheet, and the first and second signals being representative of first and second co-ordinates of the said small area, respectively.

The operation of co-ordinate generating apparatus of the type specified is described in U.K. Pat. No. 1,310,683 and also in U.S. Pat. No. 3,885,097 and it will not be described in detail here. However, when the sheet is pressed into contact with a resistive member at a point, the resistive member is first used as a potentiometer and the sheet is used as a tap to pick off a voltage corresponding to one co-ordinate of the point and then the roles of the sheet and resistive member are reversed so that the sheet forms the potentiometer and the resistive member is used to pick off a voltage corresponding to the other co-ordinate of the point.

According to a first aspect of the present invention there is provided apparatus of the type hereinbefore specified for generating signals representing the co-ordinates of a point wherein the sheet and/or the resistive member are divided into regions by spaced apart narrow elongated low resistance strips traversing the sheet or resistive member, and means for providing a signal indicating, when the sheet is pressed into contact with the resistive member, in which region of the sheet and/or the resistive member the contact is made.

Usually the currents in the first and second paths are at right angles to one another, the sheet extends over a rectangular area between first and second parallel electrodes of conducting material and the resistive member extends over a rectangular area between third and fourth parallel electrodes of conducting material, the first and second electrodes being at right angles to the third and fourth electrodes. The low resistance strips are then preferably parallel to the electrodes and divide the sheet, and/or the resistive member, into equal rectangular regions. The change-over means includes terminals for the connection of an electric supply and also connections for the electrodes and the strips, the connections connecting the regions of the sheet in parallel with one another with respect to the supply terminals and/or connecting the regions of the resistive member in parallel with one another, by way of the changeover means.

The advantages of the present invention will be seen to include an effective improvement in the linearity of the resistive surfaces equal to the product of the linearity of the undivided surface times the number of regions into which the surface has been divided; and easy provision of the most significant bits for a digital output by taking these most significant bits from the means for indicating in which region contact is made. Thus the resolution of any analogue to digital converter is increased by the same factor.

Where either the sheet or the resistive member is divided into regions, the means for indicating in which region the contact is made may include a current-sink circuit, and the change-over means may be constructed to switch cyclically through three phases in any order: a first phase in which current is passed through that sheet or member which is not divided into regions and the currentsink circuit is connected to one of the electrodes or strips of the sheet or member which is divided into regions; and second and third phases in which the co-ordinate signals are generated and the current-sink circuit is disconnected. The point of highest or lowest voltage in the sheet or member which is divided into regions is the point of contact, depending on whether current flows into or out of the sink circuit, and the voltages of those strips and electrodes not connected to the sink circuit give an indication of the region in which the contact is made.

The means for indicating in which region the contact is made may further include a comparator circuit comprising at least one transistor or field-effect transistor for and associated with each region and having its base or gate terminal connected to a strip or electrode bordering the associated region but separate from strips or electrode connected to other transistors or to the current-sink circuit. The transistors are then connected with a common emitter or drain resistor and individual collector or source resistors. In such a circuit the voltage developed across one of the collector or source resistors is indicative of the region in which the contact is made. The comparator circuit draws negligible current so that the potential of the point of contact is applied to the comparator circuit irrespective of its position on the sheet or resistive member.

Where both the sheet and the resistive member are divided into regions the change-over means may be a four-phase device when the current-sink circuit is connected in the first phase to the resistive member, in the second phase to the sheet and in the third and fourth phases disconnected while co-ordinate signals are generated. A further comparator circuit is provided for the other member which is divided into regions and this circuit can be as disclosed above.

However, when both the sheet and resistive member are divided into regions the change-over means may still be three phase: in the first phase one electrical supply terminal only is connected to the sheet or resistive member and a terminal of different potential to the said current supply terminal is connected to the resistance member or the sheet, respectively, by way of the current-sink circuit. In the second and third phases both electrical supply terminals are connected to the sheet or resistive member but the current-sink circuit is disconnected. Again two comparator circuits are required.

The order in which the phases occur in various embodiments of the invention can be changed if required.

Since adjacent regions are oppositely poled with respect to the supply terminals an analogue to digital converter translating the co-ordinate signals into digital form may advantageously include a reversible counter controlled by the comparator outputs in order to generate a correct digital output signal.

Contacts at two places form an error condition which can occur accidentally in normal used or through malfunctions of the surfaces. Such an error condition should preferably be indicated so that the co-ordinate signals can be discounted or suppressed.

According to a second aspect of the present invention therefore there is provided apparatus of the type hereinbefore specified for generating signals representing the co-ordinates of a point, including means for generating a predetermined signal when the sheet is pressed into contact with the resistive member in two separate areas.

As mentioned above in co-ordinate generating apparatus of the type specified the currents in the sheet and resistive member are usually at right angles to one another, the sheet extends over a rectangular area between first and second parallel electrodes of conducting material and the resistive member extends over a rectangular area between third and fourth parallel electrodes of conducting material, the first and second electrodes being at right angles to the third and fourth electrodes.

A first form of means for generating the predetermined signal includes means for indicating when the electrodes of the sheet are not at the same voltage or when the electrodes of the resistive member are not at the same voltage, since where one contact is made by the sheet or resistive member when used to pick off a co-ordinate voltage, the electrodes of that sheet or member should be at the same voltage (with an exception mentioned below).

The means for indicating when the electrode voltages are unequal may include a first long-tailed transistor or fieldeffect transistor pair in which a first transistor is coupled to the first or third electrode and a second transistor is coupled to the second or fourth electrode, one transistor conducting when the two electrodes are at the same voltages and the other transistor conducting when the first or third electrode has a higher voltage than the second or fourth electrode, and a second long-tailed transistor or field-effect transistor pair in which a third transistor is coupled to the first or third electrode and a fourth transistor is coupled to the second or fourth electrode, the third or fourth transistor conducting when both electrodes are at the same voltage and the fourth or third transistor, respectively, conducting when the second or fourth electrode has a higher voltage than the first or third electrode, the two transistors which conduct when electrodes are at the same voltages having a single load resistor, and the voltage across this load resistor being indicative, in operation, of whether a double contact has occurred.

When detection of double contacts is based on a normal condition in which two electrodes have the same voltage, double contacts of the type which occur on lines parallel to the electrodes are not indicated. This problem is overcome if the means for generating the predetermined signal includes a resistor connected in series with the change-over means to pass the currents which flow through the sheet and the resistive member when the first and second signals representative of co-ordinates are generated, first and second storage circuits, switching means for applying the voltage generated across the resistor to the first storage circuit when the said first signal is generated and to the second storage circuit when the said second signal is generated, a first comparator circuit, connected to compare the voltage across the resistor when the said first signal is generated with the voltage at the output of the first storage means, a second comparator circuit connected to compare the voltage across the resistor when the said second signal is generated with the voltage at the output of the second storage means, and an OR gate with first and second inputs coupled at the outputs of the first and second comparator circuits, respectively.

This arrangement relies on a reduction in resistance which occurs when the sheet or resistive member is bridged by the resistive member or the sheet, respectively, the resulting increase in current being measured by the voltage appearing across the series resistor. In a first cycle of the change-over means, voltages are stored by the storage means which are representative of the currents flowing through the sheet and resistive member and in the next cycle the comparison means compares these stored voltages with newly derived voltages now representative of the current flowing through the sheet and resistive member. If a double contact has occurred the effective resistance of either or both the sheet and resistive member will have changed and either or both comparators will provide the input for the OR gate, the output of which can be used to indicate a double contact and provide an alarm, or automatic suppression of the co-ordinate signals.

The second aspect of the invention may be used with or without the first aspect with co-ordinate generating apparatus of the type specified.

Certain embodiments of the invention will now be described by way of example, with reference to the accompanying drawings, in which.

Figure 1:
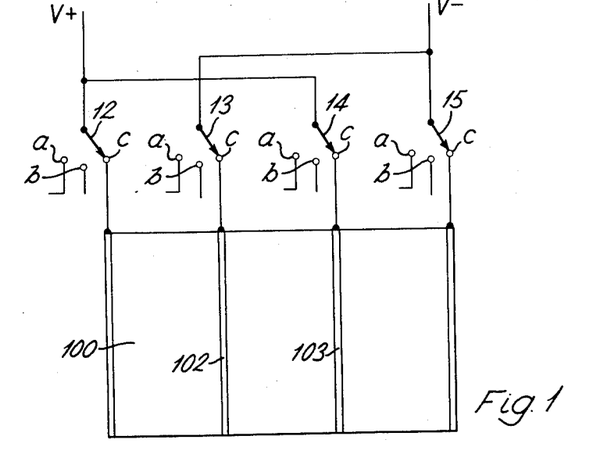
FIG. 1 shows a resistive sheet and connections for the sheet for use in an embodiment of the first aspect of the present invention.
Figure 2:
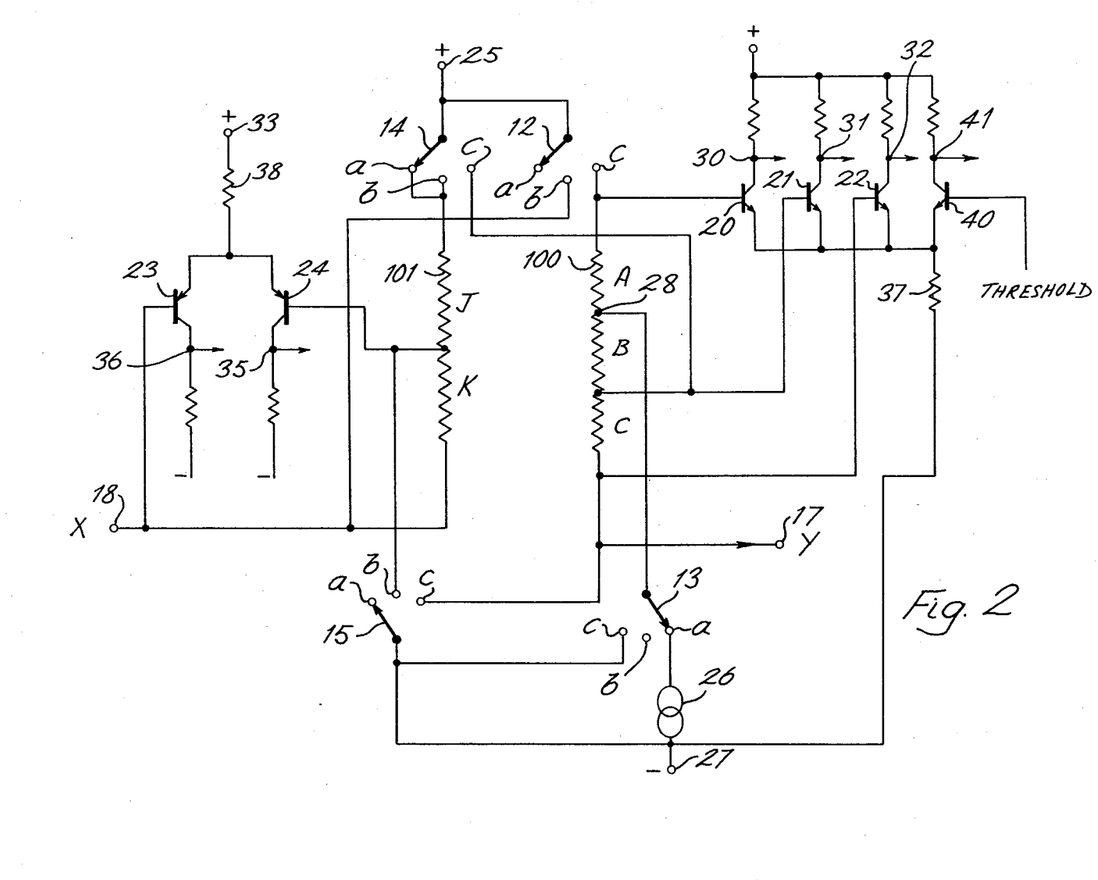
FIG. 2 is a circuit diagram of an embodiment of the first aspect of the present invention.

In FIG. 1 a sheet 100 is used to replace the sheet 10 of FIGS. 1a and 1b of the co-ordinate generating apparatus described in U.K. Pat. No. 1,310,683 and U.S. Pat. No. 3,885,097. The sheet 100 is stretched over but spaced apart from a resistive member 101 shown schematically in FIG. 2. The sheet, the resistance member and their general layout is as shown in the earlier specifications except that both the sheet and the resistive member are divided into rectangles by means of low resistance strips, these strips being designated 102 and 103 for the sheet 100. The strips in the sheet are at right angles to the strips in the resistive member, and parallel to electrodes along opposite edges of the sheet. The strips in the resistive member are parallel to electrodes along opposite edges of the member. In order to increase the effective linearity of the sheet the various rectangles are connected in parallel between positive and negative supply terminals when current is to be passed through the sheet by means of contacts $c$ of switches 12 to 15. The rectangles of the resistive member are similarly connected in parallel to the supply terminals by means of contacts $b$ of the switches 12, 14 and 15 when current is to be passed through the resistive member. In FIG. 2 the sheet 100 is shown schematically as three resistors A, B and C corresponding to the three rectangles and the resistive member 101 is shown as resistors J and K corresponding to two rectangles. The switches 12 to 15 also appear in FIG. 2, and it will be seen that these switches perform other functions in addition to connecting the various regions in parallel. These further functions are described below.

The basic mode of operation of the apparatus of FIG. 2 is the same as the co-ordinate generating apparatus disclosed in the above mentioned patents, in that current is first passed through the resistive member 101 with the switches 12 to 15 in the $b$ position and when a stylus presses the sheet 100 on to the member 101 the sheet 100 acts as a potentiometer tap and picks off a voltage corresponding to the $y$ co-ordinate from the member 101. Thus a signal representative of the $y$ co-ordinate is presented at a terminal 17 and passed to circuits such as those shown in the above mentioned specifications for indicating this co-ordinate. The apparatus relies on only a small current being drawn from the terminal 17 so that the voltage at the point of pick-up is not upset. After an interval with the switches in the position $b$ they move to position $c$ so that the roles of the sheet 100 and resistive member 101 are reversed and a signal representative of the $x$ co-ordinate appears at a terminal 18. The switches 12 to 15 are usually made up of solid state devices such as transistors and the switching cycles can be controlled by logic circuits or an oscillator.

In the arrangement of FIG. 2 each $y$ co-ordinate signal can relate to a similar position in each of the parallel connected regions with respect to positive and negative voltages applied to edges of the regions and similarly each $x$ co-ordinate signal can relate to either of the two regions. Hence it is necessary to determine in which region of the sheet 100 and which region of the resistive member 101 the point of contact occurs when the stylus is used to indicate a point. Thus in addition to the two phases of the cycle of operation mentioned in which the $x$ and $y$ co-ordinate signals are generated it is necessary to add a further phase in which the regions in which contact is made are detected.

To this end transistors 20, 21 and 22 are connected as shown to the edges and one intermediate low resistance strip of the sheet 100. Similarly transistors 23 and 24 are connected to the resistive member 101 in the way shown. In a position $a$ of the switches 12 to 15 a positive terminal 25 of an electrical supply is connected to the resistive member 101, while a current-sink circuit 26 (i.e. a circuit taking a current which is substantially unaffected over the range of interest by the impedance connected in series therewith), connected to a negative terminal 27 of the supply, makes contact with a low resistivity strip 28 in the sheet 100 which is not connected to one of the transistors 20, 21 and 22.

An example of the operation of the arrangement of FIG. 2 will now be given. Suppose the stylus is pressed on the sheet 100 so that contact is made between the regions B and J. Current then flows from the positive terminal 25 through part of the region J, through part of the region B and through the strip 28 to the current-sink circuit 26. The strip 28 takes up a negative voltage near to that of the terminal 27 and the voltage drop between the terminals 25 and 27 appears across that part of the region J and that part of the region B which is in the current path, all other currents in the system being comparatively small. Since the voltage applied to the base of the transistor 20 is slightly below the voltage at the strip 28 this transistor is practically cut off, there is practically no voltage drop across the region A and the output voltage of the transistor 20 at a terminal 30 is high. The voltage at the base of the transistor 21 is higher than that at the base of the transistor 20 and the transistor 21 conducts so that its output terminal 31 is at a low voltage. The base of the transistor 22 is, since this transistor does take a small current, below that of the transistor 21 so that its output voltage at a terminal 32 will be higher than that at the terminal 31. In this case and indeed in all others that one of the terminals 30, 31 and 32 which is at the lowest voltage indicates in which region the contact has been made. In this respect the transistors 20, 21 and 22 relate to the regions A, B and C, respectively, as can be seen if further examples of operation are taken.

Currents flowing in the resistive member 101 derive mainly from the supply terminal 21 but to a much smaller extent from a supply terminal 33 connected to the emitters of PNP transistors 23 and 24. Thus if, as before, the contact between the sheet and resistive member is made in the region J, a point in this region will be at the lowest potential for the whole of the resistive member. This means that the base of the transistor 24 will be at a lower voltage than that of the transistor 23 thus giving a higher voltage at a terminal 35 than at a terminal 36. If the contact had been made in the region K the transistor 24 and the terminal 36 would be higher in voltage than the terminal 35.

Since the transistors 20 to 22 have a common emitter resistor 37 and the transistors 23 and 24 have a common emitter resistor 38 one transistor in each group will tend to take over conduction cutting off the others so that it becomes immediately clear in which regions the contact has been made.

A transistor 40 functions as a contact detector and inhibits, by means not shown, co-ordinate signals unless contact has been made. The base of the transistor 40 is biassed by means of a threshold voltage so that this transistor conducts before contact between the sheet and the resistive member has been made. However, the threshold voltage is such that as soon as a contact has been established the voltage applied to one of the transistors 20, 21 and 22 is more positive than the threshold voltage and one of the transistors 20 to 22 conducts at the expense of the transistor 40 by virtue of the current in the resistor 37. The transistor 40 ceases to conduct so that its output signal at a terminal 41 rises releasing the inhibition on co-ordinate signals.

Figure 5:
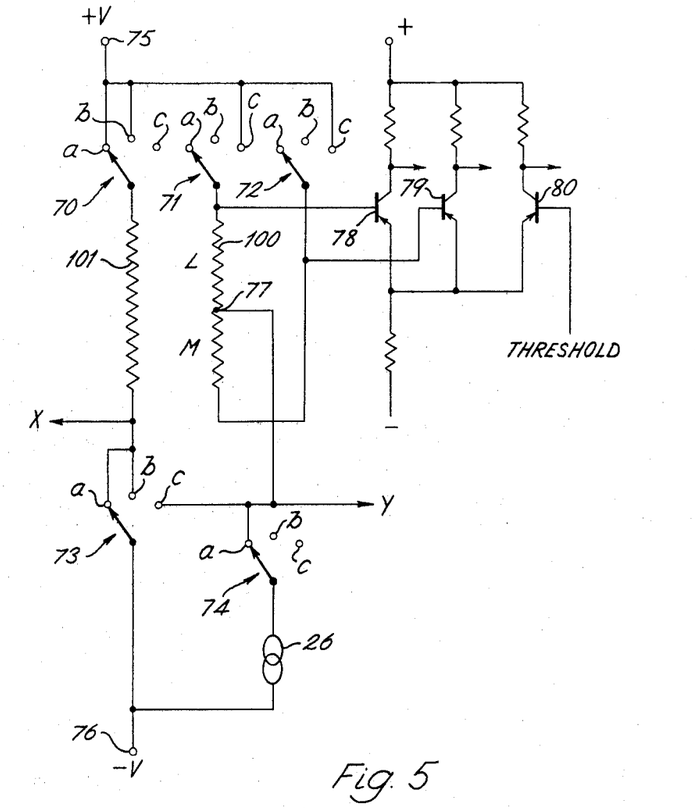
FIG. 5 is a circuit diagram of an embodiment of the first aspect of the invention in which only the sheet or a resistive member are divided into regions.
Figure 6:
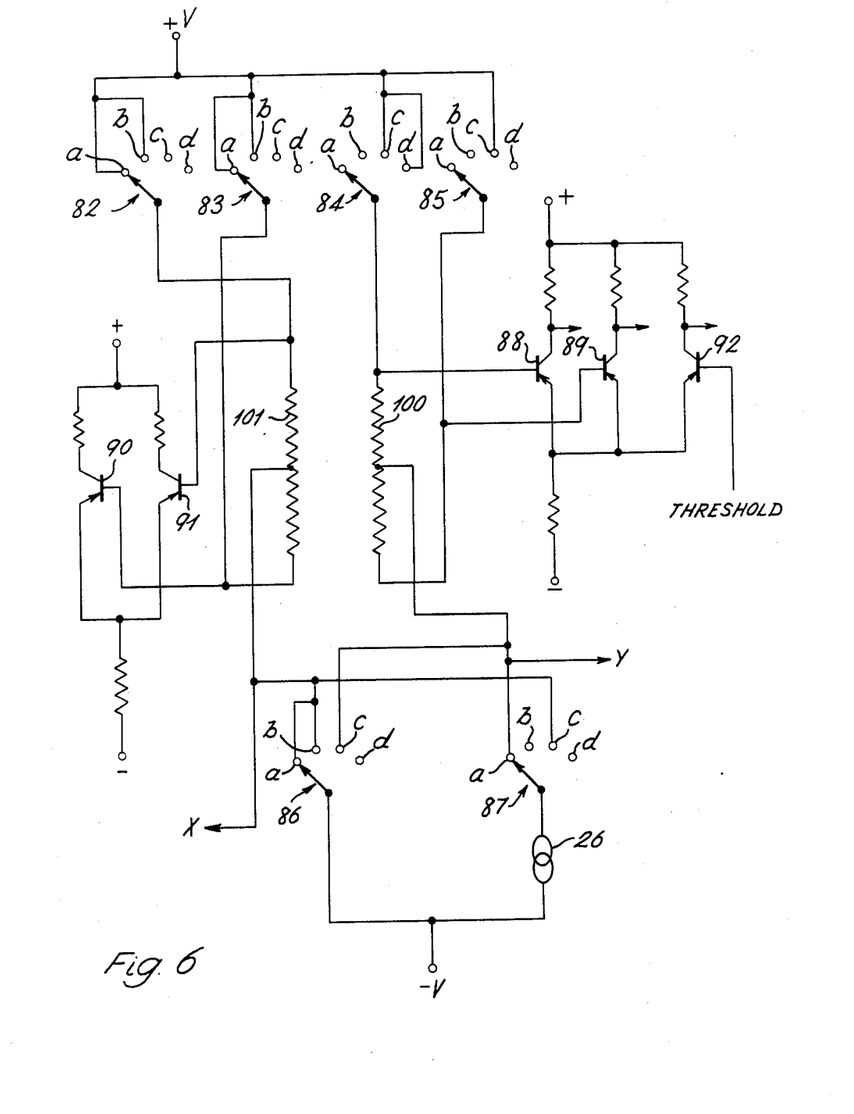
FIG. 6 is a circuit diagram of an embodiment of the first aspect of the invention in which both the sheet and the resistive member are divided and four phase operation is employed.

A more simple arrangement is obtained where only the sheet or the resistive member is divided by conductive strips as in FIG. 5. Again three phase operation is employed using switches 70 to 74. In position *a* current is passed through the resistive member 101 between positive and negative supply terminals 75 and 76 and the current sink 26 is connected to a strip 77 dividing the sheet 100 into two halves L and M. It will be apparent from the foregoing that when a contact is made between the manner 101 and the sheet 100, one of transistors 78 or 79 will conduct at the expense of the other and the lower collector voltage indicates in which half L or M of the sheet the contact was made. A transistor 80 indicates, in the manner disclosed in relation to the transistor 40 of FIG. 2, when there is no contact. In positions *b* and *c* co-ordinate signals are generated when a stylus is used to indicate a point.

Where both the sheet and the resistive member are divided as in FIG. 6 a four phase cycle may be used. In position *a* of switches 82 to 87 current is passed in parallel through two sections of the member 101 and the current sink 26 is connected to the sheet 100. Transistors 88 and 89 then indicate in which half of the sheet a contact occurs. In position *b* of the switches 82 to 87 current passes as before in the member 101 but the sheet 100 is used to pick-off a Y co-ordinate voltage. Current passes in parallel through the two halves of the sheet 100 in positions *c* and *d* so that transistors 90 and 91 can indicate in position *c* in which half a contact is made, current sink 26 then being connected to the member 101, and so that an X co-ordinate signal is generated in position *d*. Transistor 92 again indicates when a contact between the sheet and the resistive member occurs.

Figure 3:
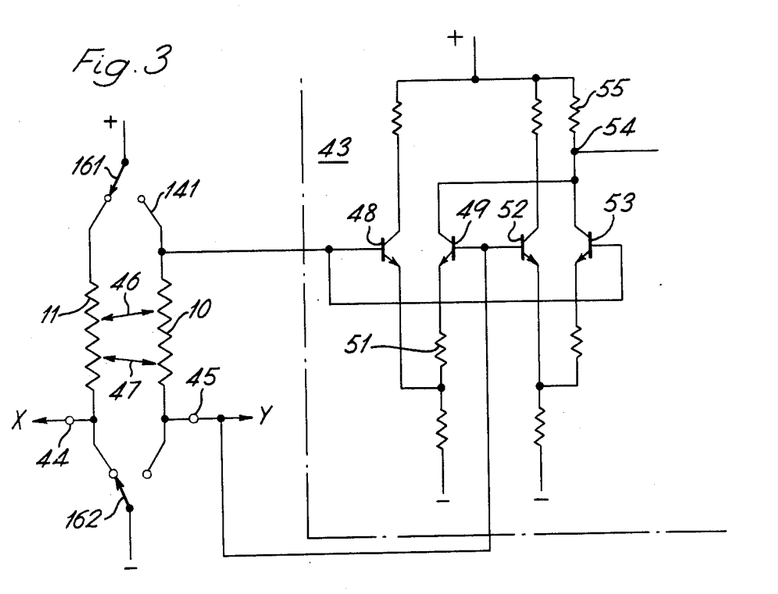
FIG. 3 is a circuit diagram of an embodiment according to the second aspect of the invention.

As has been mentioned it is desirable to be able to detect when more than one contact is made. FIG. 3 shows a suitable circuit and it may be added to any of the arrangements described in U.K. Pat. No. 1,310,683 or U.S. Pat. No. 3,885,097. A sheet 10 and a resistive member 11 are connected as shown for example in one of FIGS. 2, 3 or 4 of those earlier specifications except that in addition a circuit 43 comprising four transistors is added. Terminals 44 and 45 are, of course, connected to the various circuits mentioned in the foregoing specifications for processing those voltages which represent co-ordinates.

When the sheet 10 is being used to pick off a voltage at a point of contact from the resistive member 11 and the resistive member is carrying a current, the two edges 141 and 142 of the sheet should be at the same voltage but when two contacts are made as indicated by arrows 46 and 47 each of the edges 141 and 142 will take up a different voltage indicating that two contacts have been made.

In the circuit 43 when there is only one contact the bases of transistors 48 and 49 are at the same voltage but the transistor 48 conducts because the emitter circuit for the transistor 49 includes a resistor 51. Similarly in the pair of transistors 52 and 53 the transistor 52 conducts when there is only one contact. Hence for a single contact the voltage at terminal 54 is high. If on the other hand there are two contacts as shown, the edge 141 will be more positive than the edge 142, and the transistor 49 in the pair 48 and 49 conducts while in the other pair the transistor 52 conducts as before. However, since a common load resistor 55 for the transistors 49 and 53 now receives a current, the voltage at terminal 54 is comparatively low indicating a double contact. Similarly if double contacts occur which make the edge 142 more positive than the edge 141 the transistor 53 starts to conduct and the voltage at the terminal 54 is again lower than when there is a single contact. The output from the terminal 54 can be used to suppress the co-ordinate signals when a double contact occurs.

If the circuit of FIG. 3 is used with the multi-region arrangement of FIG. 2 the circuit 43 must be connected between edges of the sheet.

The arrangement of FIG. 3, although having the advantage of being simple, suffers from the disadvantage that if double contacts occur at points parallel to an edge, the edges continue to have voltages equal to one another and the circuit 43 does not operate to give an alarm.

Figure 4:
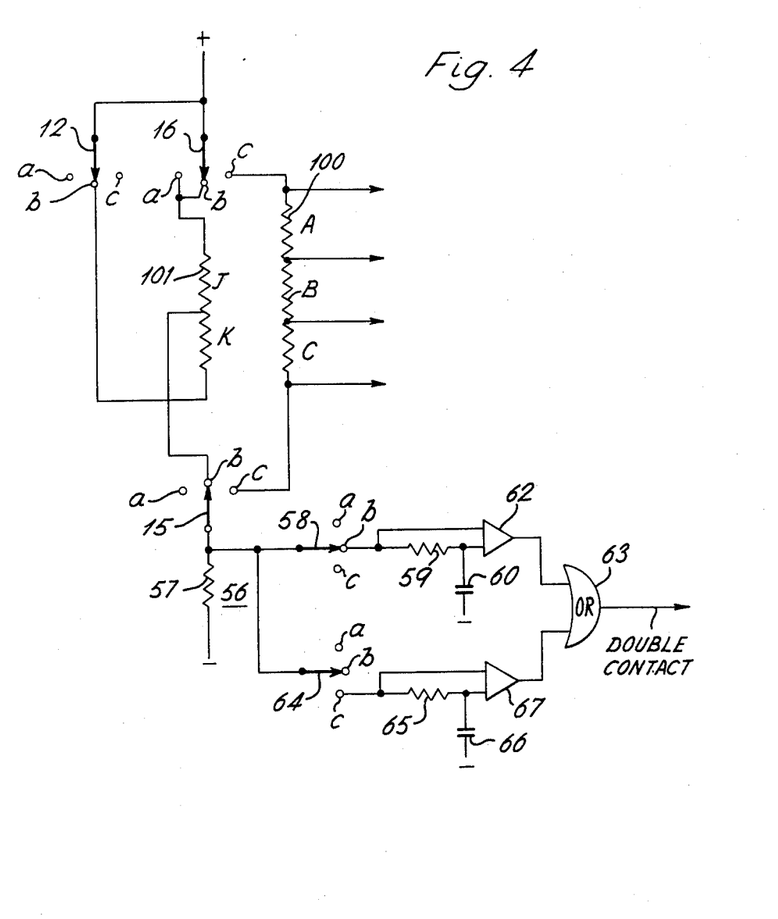
FIG. 4 is a circuit diagram of another embodiment of the second aspect of the present invention.

This disadvantage is overcome by the circuit of FIG. 4 which shows part of the circuit of FIG. 2 with an additional contact detection circuit 56. A resistor 57 is connected in series with the supply to the sheet or resistive member when the circuit is in the two co-ordinate-generation phases. If there is only one contact the current passing through the resistor 57 is determined solely by the resistance of the sheet or resistive member but when there are two contacts part of the sheet or resistive member, whichever is in circuit with the supply, is bridged by part of the resistive member or sheet, respectively, reducing the resistance in the circuit and increasing the current and voltage drop across the resistor 57. Such changes are detected by the circuit 56. The voltage at the end of the resistor adjacent to the switch 15 is applied by way of a switch 58, when these switches are in position *b*, to a differential amplifier 62 and to a storage circuit comprising a resistor 59 and a capacitor 60. The voltage across the resistor 57 is stored in the capacitor 60 and next time the switches 15 and 58 are in the position *b* the voltage stored by the capacitor 60 will be compared with the current voltage across the resistor 57 by the comparator 62. If there is any difference in these voltages, indicating that a double contact has occurred, or been relieved, the amplifier 62 provides an output signal. One input of an OR gate 63 is connected to the amplifier 62 and the OR gate 63 is chosen so that a change in the amplifier output in the sense indicating the occurrence of a double contact opens the OR gate passing a signal to a circuit (not shown) where the co-ordinate signals are suppressed. It will be appreciated that a circuit made up of a switch 64, a resistor 65, a capacitor 66 and a differential amplifier 67 functions in the same way to indicate a double contact when the switches are in position *c*. However, since currents flow in the sheet 100 and the resistive member 101 in directions which are approximately at right angles double contacts having the same *x*, or the same *y*, co-ordinates will be indicated by one or other of the inputs to the OR gate 63.

While certain embodiments of the invention have been described by way of example it will be appreciated that it can be put into effect in many other ways. In particular different combinations of divided and undivided resistive sheets and resistive members can be used, the switches shown will normally be transistors or other solid state devices or logic circuits instead of mechanical switches and comparators of FIGS. 2, 3, 5 and 6 may be replaced by integrated circuits comprising one or more comparator elements each of which employs several transistors to replace each single transistor in the said comparators. Such integrated circuits allow a higher voltage swing at the input than can be applied to a single transistor and require less bias current. A suitable integrated circuit is the National Semiconductor LM 339 having four comparator elements. Furthermore most of the variations and arrangements shown in the two aforementioned British and U.S. specifications can be used in combination with the present invention.

I claim:

1. Apparatus for generating signals representing the co-ordinates of a point, including a sheet of electrically resistive material held in tension across, and adjacent to, but not in contact with, the smooth surface of an electrically resistive member, the sheet being of such material and/or so mounted that it is able to make contact temporarily with the said surface of the resistive member over a relatively small area when pressed towards the said surface by means for indicating the position of a point, change-over means for causing current supplied to the apparatus to flow alternately in two paths, a first path in which current flows in a substantially single direction through the sheet, and a second path in which current flows in a substantially single direction, at an angle to the other current direction through the resistive member, and means for deriving first and second signals, when the sheet is pressed at a relatively small area into contact with the resistive member, the first signal being dependent upon the voltage of the sheet when current flows through the resistive member, the second signal being dependent upon the voltage of the resistive member when current flows through the sheet, and the first and second signals being representative of first and second co-ordinates of the said small area, respectively, wherein the sheet and/or the resistive member are divided into regions by spaced apart narrow elongated low resistance strips traversing the sheet or resistive member, and means for providing a signal indicating, when the sheet is pressed into contact with the resistive member, in which region of the sheet and/or the resistive member the contact is made.

2. Apparatus according to claim 1 wherein the sheet extends over a rectangular area between first and second parallel electrodes of conducting material and the resistive member extends over a rectangular area between third and fourth parallel electrodes of conducting material, the first and second electrodes being at right angles to the third and fourth electrodes.

3. Apparatus according to claim 2 wherein the low resistance strips are parallel to the electrodes and divide the sheet and/or the resistive member into equal rectangular regions.

4. Apparatus according to claim 3 wherein the change-over means includes terminals for the connection of an electrical supply and also connections for the electrodes and the strips, the connections connecting the regions of the sheet in parallel with one another with respect to the supply terminals and/or connecting the regions of the resistive member in parallel with one another, by way of the change-over means.

5. Apparatus according to claim 4 wherein either the sheet or the resistive member are divided into regions and the change-over means is constructed to switch cyclically through three phases in any order: a first phase in which current is passed through that sheet or member which is not divided into regions and a current-sink circuit is connected to one of the electrodes or strips of the sheet or member which is divided into regions; and second and third phases in which the co-ordinate signals are generated and the current sink circuit is disconnected.

6. Apparatus according to claim 5 wherein the means for indicating in which region the contact is made includes a comparator circuit comprising at least one transistor or field-effect transistor for and associated with each region and having its base or gate terminal connected to a strip or electrode bordering the associated region but separate from strips or electrodes connected to other transistors or to the current sink circuit, the transistors being connected with a common emitter resistor an individual collector resistors, or the field-effect transistors being connected with a common drain resistor and individual source resistors.

7. Apparatus according to claim 4 wherein both the resistive member and the sheet are divided into regions, and the change-over means is constructed to switch cyclically through four phases in any order: a first phase in which current is passed through the resistive member and a current-sink circuit is connected to the sheet; a second phase in which one co-ordinate signal is generated; a third phase in which current is passed through the sheet and the current-sink circuit is connected to the resistive member; and a fourth phase in which the other co-ordinate signal is generated.

8. Apparatus according to claim 4 wherein both the resistive member and the sheet are divided into regions and the change-over means is constructed to switch cyclically through three phases in any order: a first phase in which one terminal of an electrical supply is connected to the sheet or the resistive member and another terminal of the supply of different potential is connected to the resistive member or sheet, respectively, by way of a current-sink circuit, and second and third phases in which co-ordinate signals are generated.

9. Apparatus according to claim 8 wherein the means for indicating in which region the contact is made includes first and second comparator circuits associated with the sheet and the resistive member, respectively, each comparator circuit comprising at least one transistor or field-effect transistor for and associated with each region of the sheet or the resistive member associated with that comparator circuit and having its base or gate terminal connected to a strip or electrode bordering the associated region but separate from strips or electrodes connected to other transistors or to the current sink circuit, the transistors being connected with a common emitter resistor and individual collector resistors, or the field-effect transistors being connected with a common drain resistor and individual source resistors.

10. Apparatus for generating signals representing the co-ordinates of a point including a sheet of electrically resistive material held in tension across, and adjacent to, but not in contact with, the smooth surface of an electrically resistive member, the sheet being of such material and/or so mounted that it is able to make contact temporarily with the said surface of the resistive member over a relatively small area when pressed towards the said surface by means for indicating the position of a point, change-over means for causing current supplied to the apparatus to flow alternately in two paths, a first path in which current flows in a substantially single direction through the sheet, and a second path in which current flows in a substantially single direction, at an angle to the other current direction through the resistive member, means for deriving first and second signals, when the sheet is pressed at a relatively small area into contact with the resistive member, the first signal being dependent upon the voltage of the sheet when current flows through the resistive member, the second signal being dependent upon the voltage of the resistive member when current flows through the sheet, and the first and second signals being representative of first and second co-ordinates of the said small area, respectively, and means for generating a predetermined signal when the sheet is pressed into contact with the resistive member in two separate areas.

11. Apparatus according to claim 10 wherein the sheet extends over a rectangular area between first and second parallel electrodes of conducting material and the resistive member extends over a rectangular area between third and fourth parallel electrodes of conducting material, the first and second electrodes being at right angles to the third and fourth electrodes.

12. Apparatus according to claim 11 wherein the means for generating the predetermined signal includes comparator means for providing a signal indicating when the first and second electrodes are not at the same voltage, and/or for providing a signal indicating when the third and fourth electrodes are not at the same voltage.

13. Apparatus according to claim 12 wherein the comparator means includes a first long-tailed transistor or field-effect transistor pair in which a first transistor is coupled to the first or third electrode and a second transistor is coupled to the second or fourth electrode, one transistor conducting when the two electrodes are at the same voltages and the other transistor conducting when the first or third electrode has a higher voltage than the second or fourth electrode, and a second long-tailed transistor or field-effect transistor pair in which a third transistor is coupled to the first or third electrode and a fourth transistor is coupled to the second or fourth transistor, the third or fourth transistor conducting when both electrodes are at the same voltage and the fourth or third transistor, respectively, conducting when the second or fourth electrode has a higher voltage than the first or third electrode, the two transistors which conduct when electrodes are at the same voltages having a single load resistor, and the voltage across the load resistor being indicative, in operation, of whether a double contact has occurred.

14. Apparatus according to claim 11 wherein the means for generating the predetermined signal includes a resistor connected in series with the change-over means to pass the currents which flow through the sheet and the resistive member when the first and second signals representative of co-ordinates are generated, first and second storage circuits, switching means for applying the voltage generated across the resistor to the first storage circuit when the said first signal is generated and to the second storage circuit when the said second signal is generated, a first comparator circuit, connected to compare the voltage across the resistor when the said first signal is generated with the voltage at the output of the first storage means, a second comparator circuit connected to compare the voltage across the resistor when the said second signal is generated with the voltage at the output of the second storage means, and an OR gate with first and second inputs coupled at the outputs of the first and second comparator circuits, respectively.

* * * * *